United States Patent [19]

Yokota

[11] Patent Number: 4,655,613

[45] Date of Patent: Apr. 7, 1987

[54] LINEAR MOTION ROLLING CONTACT BEARING ASSEMBLY

[75] Inventor: Yasunori Yokota, Ebina, Japan

[73] Assignee: Nippon Thompson Co., Ltd., Tokyo, Japan

[21] Appl. No.: 778,588

[22] Filed: Sep. 20, 1985

[30] Foreign Application Priority Data

Sep. 20, 1984 [JP] Japan .......................... 59-141570[U]

[51] Int. Cl.⁴ ............................................ F16C 29/04
[52] U.S. Cl. ..................................................... 384/49
[58] Field of Search ........................ 308/6 R, 6 B, 3.5; 384/575, 578, 579, 49

[56] References Cited

U.S. PATENT DOCUMENTS 2,994,567 8/1961 Liebmann ............................ 308/3.5
3,767,278 10/1973 Knowles ............................. 384/575
3,922,037 11/1975 Yamada et al. ..................... 308/6 B Primary Examiner—Lenard A. Footland Attorney, Agent, or Firm—Alan H. MacPherson; Steven F. Caserza; Richard Franklin

[57] ABSTRACT

A linear motion rolling contact bearing assembly includes a trough-shaped bed, a trough-shaped table which straddles the bed, a plurality of balls interposed between the table and the bed for providing a relative motion between the table and the bed along the longitudinal direction of the assembly, and a retainer for retaining the balls in position. The retainer includes an elongated plate provided with a plurality of holding holes for holding the balls in position and at least one side projection which projects sideways from the plate so as to maintain the retainer in its intended position. Preferably, the top and bottom side projections are provided on both sides of the plate so that the retainer has an I-shaped cross section. The retainer is also preferably provided with one or more tabs provided around each of the holding holes so as to securely hold the balls in position. The side projections may be provided also in the form of a plurality of dots.

6 Claims, 12 Drawing Figures

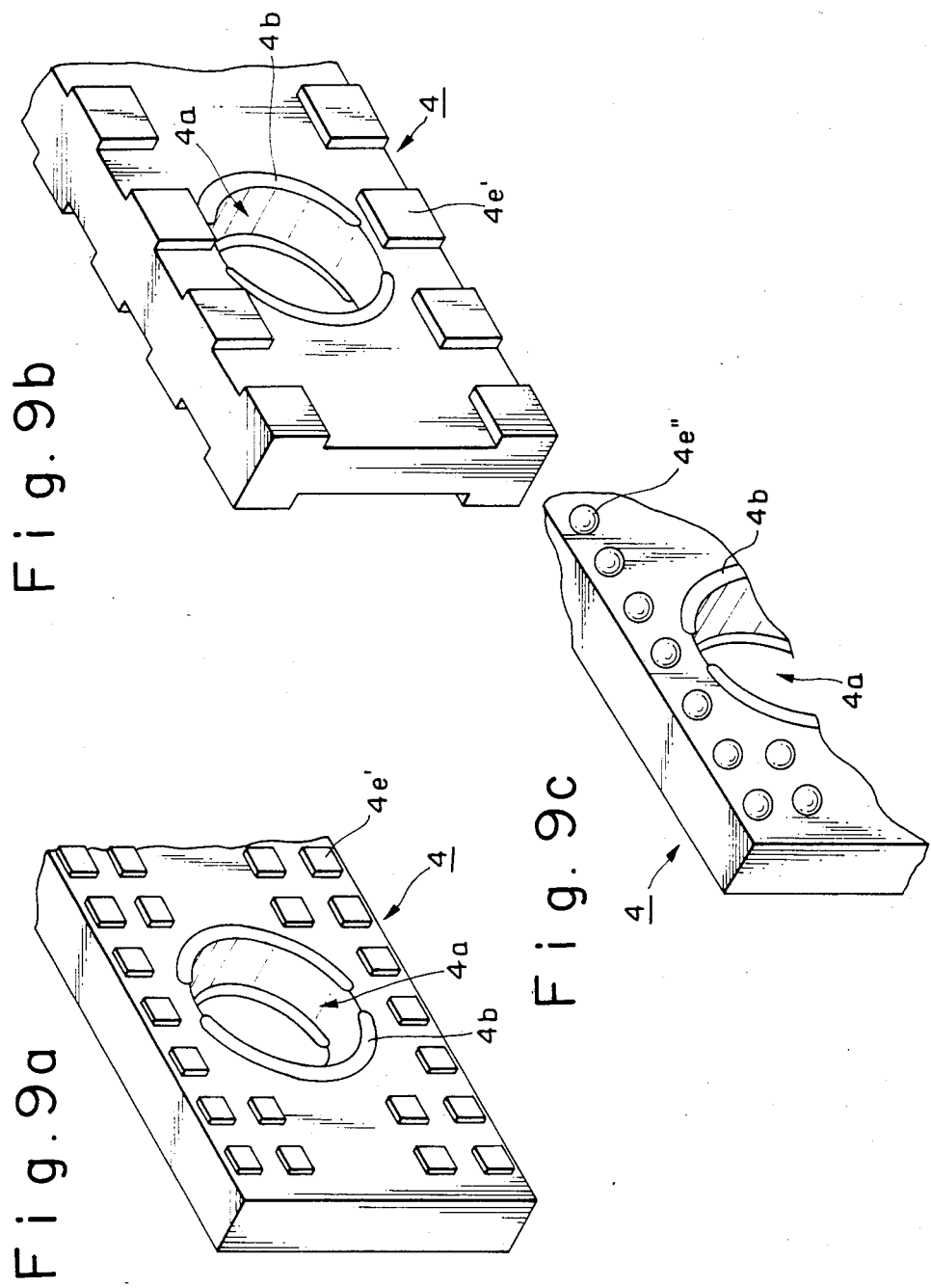

LINEAR MOTION ROLLING CONTACT BEARING ASSEMBLY

BACKGROUND OF THE INVENTION

1. Field of the Invention

The present invention concerns a rolling contact bearing assembly, and, in particular, relates to a linear motion rolling contact bearing assembly having a particularly shaped retainer for retaining a plurality of rolling members in position.

2. Background of the Invention

A linear motion rolling contact bearing assembly is well known in the art, and, as shown in FIG. 1, it includes a table 1 which is typically formed by bending a thin steel plate to have a U-shaped cross section, a bed 2 which is also typically formed by bending a thin steel plate to have a U-shaped cross section and a plurality of rolling members or balls 3 in the illustrated case, interposed between the table 1 and the bed 2 thereby providing a relative motion between the table 1 and the bed 2. The table 1 has a U-shaped cross section and thus it has a flat base section and a pair of side wall sections upstanding on opposite sides of the flat base section. Similarly, the bed 2 is U-shaped in cross section so that it also has a flat base section and a pair of side wall sections. In the illustrated case, the table 1 is made larger in width than the bed 2 so that the table 1 straddles the bed 2 when assembled.

The opposed surfaces of the side wall sections of the table 1 and the bed 2 are formed with paired guide grooves extending in the longitudinal direction of the assembly, thereby defining a guide passage for guiding the rolling motion of the balls in rolling contact with the guide grooves. As shown in FIG. 1, also provided between the opposed surfaces of the side wall sections of the table 1 and the bed 2 is a retainer 4' for retaining the balls 3 in position as spaced apart from one another at a predetermined pitch. The retainer 4' is rectangular in shape and is provided with a plurality of simple holes as spaced apart from one another in a line. As also shown in FIG. 1, an upper end member 5 is fixedly attached to each end of the table 1, whereas, a lower end member 6 is fixedly attached to each end of the bed 6, so that the internal space defined by the table 1 and the bed 2 may be completely enclosed when the table 1 is placed in alignment with the bed 2.

When the table 1 moves relative to the bed 2 along the longitudinal direction of the assembly, the balls 3 also roll sandwiched between the paired guide grooves, and, thus, the retainer 4' also moves in the longitudinal direction. In this case, the retainer 4' is subjected to rather complicated movements, shown in FIG. 2, in which the intended normal position of the retainer 4' is indicated by the solid line; but the retainer 4' becomes inclined as a result of its rolling motion as it moves in the longitudinal direction of the assembly. The retainer 4' under the condition may be inclined as far as 5 degrees. When analyzing the motion of the retainer 4' during movement along the longitudinal direction of the assembly, it becomes clear that the retainer 4' is subjected to a rolling motion, which is the clockwise or counterclockwise motion of the retainer 4' around the ball center C, a translational motion, which is the horizontal motion of the retainer 4' to the left or to the right of the ball 3, a yawing motion, which is the vertical motion of the retainer 4' upward or downward due to the gap between the ball 3 and the retainer 4', and a pitching motion, which is the front and rear motion of the retainer 4' due to the gap between the ball 3 and the retainer 4'.

Since the prior art retainer 4' is subjected to these various motions, there are various disadvantages resulting therefrom. For example, if the gap between the ball 3 and the retainer 4' is large, the retainer 4' can be shifted sideways of the ball 3 so as to come in contact with one side wall of the table 1 or the bed 2, thereby increasing the resistance against the relative motion between the table 1 and the bed 2. Moreover, since there is a gap between the upper and lower end members 5 and 6, the retainer 4' may project out of the assembly as passing through the gap, whereby the retainer 4' often becomes stuck between the upper and lower end members 5 and 6. In addition, a lubricant cannot be distributed uniformly along the entire length of the retainer 4'.

SUMMARY OF THE INVENTION

In accordance with the principle of the present invention, there is provided a linear motion rolling contact bearing assembly having an improved retainer for retaining a plurality of rolling members interposed between a table and a bed. The retainer of the present invention includes an elongated plate of generally rectangular shape, which is provided with a plurality of holding holes for holding therein rolling members and which is also provided with at least one side projection projecting from its side surface. The side projection has a top which is located closer to the associated side wall section of the U-shaped table or bed so that the retainer may be maintained in its intended posture as closely as possible. Therefore, if the retainer is shifted out of its intended position, and comes into contact with the associated side wall section of the table or bed with its projection, the contact area between the retainer and the associated side wall section is limited so that there will be no increase in resistance against the relative motion between the table and the bed.

In the preferred embodiment, a trapezoidally shaped lower end member is integrally formed at each end of the bed and a modified U-shaped upper end member, which is also commensurate in shape with the trapezoidal lower end member, is integrally provided at each end of the table. Thus, the provision of the side projection in the retainer, together with such a combination of a trapezoidal lower end member and a modified U-shaped upper end member, prevents the retainer from sticking out of the assembly when it passes through the gap between the upper and lower end members due to the interference between the retainer and either one or both of the end members.

It is therefore a primary object of the present invention to obviate the disadvantages of the prior art as described above and to provide an improved linear motion rolling contact bearing assembly.

It is another object of the present invention to provide an improved linear motion rolling contact bearing assembly including a retainer having a novel structure.

It is a further object of the present invention to provide an improved linear motion rolling contact bearing assembly smooth and reliable in operation.

Other objects, advantages and novel features of the present invention will become apparent from the following detailed description of the invention when con-

BRIEF DESCRIPTION OF THE DRAWINGS

FIGS. 9a through 9c are schematic, perspective views showing several modifications of the retainer which may be provided in the present bearing assembly.

DESCRIPTION OF THE PREFERRED EMBODIMENTS

Figure 1:
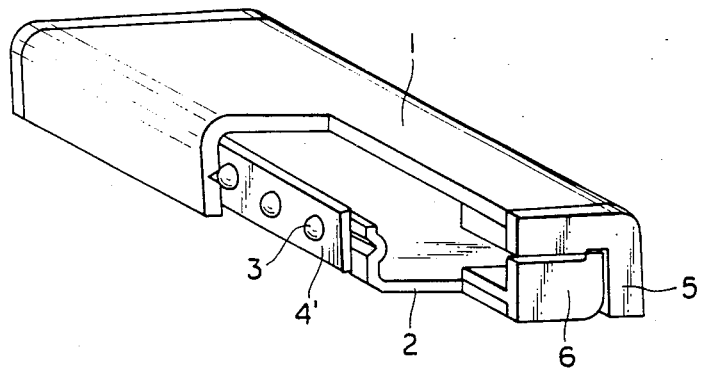
FIG. 1 is a partially cut-away, schematic, perspective view showing the overall structure of the typical prior art linear motion rolling contact bearing assembly using balls as the rolling members.
Figure 2:
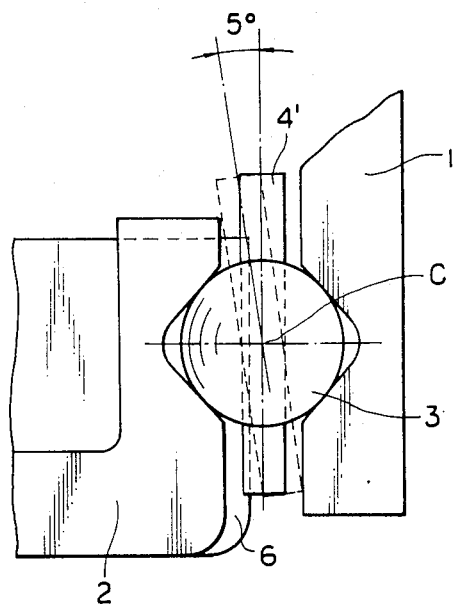
FIG. 2 is a schematic illustration on a somewhat enlarged scale showing the motion of the retainer plate provided in the assembly of FIG. 1.
Figure 3:
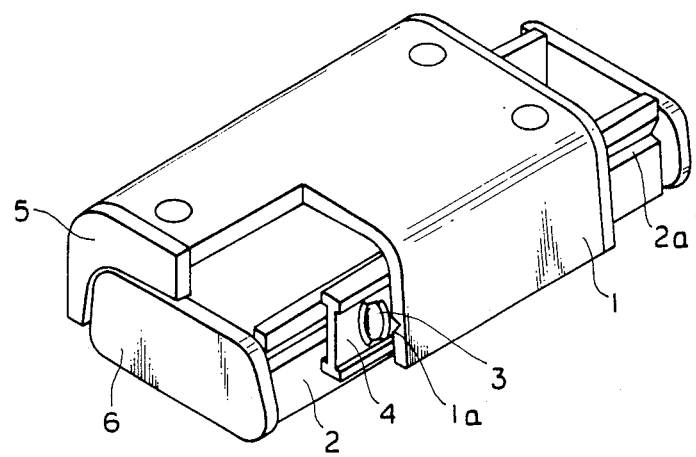
FIG. 3 is a partially cut-away, schematic, perspective view showing the overall structure of a linear motion rolling contact bearing assembly constructed in accordance with one embodiment of the present invention.
Figure 4:
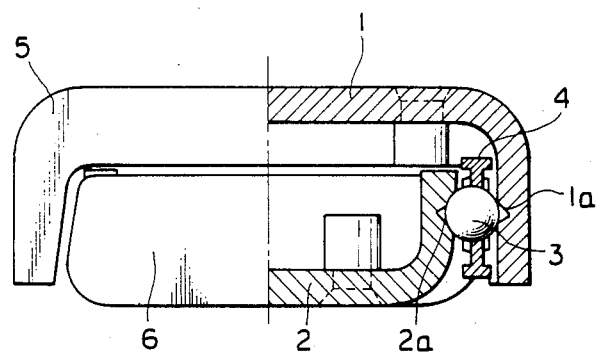
FIG. 4 is a schematic illustration, half in end view and half in transverse cross section, showing the structure of the assembly of FIG. 3.

Referring now to FIGS. 3 and 4, there is schematically shown a linear motion rolling contact bearing assembly using balls as the rolling members, which is constructed in accordance with one embodiment of the present invention. As shown, the present linear motion rolling contact bearing assembly includes a trough shaped table 1 which is preferably formed by suitably bending a thin steel plate and thus has a U-shaped cross section. Thus, the table 1 includes a flat base section and a pair of side wall sections which extend upright from both sides of the flat base section. The present bearing assembly also includes a similarly trough-shaped bed 2 which is also preferably formed by suitably bending a thin steel plate and thus has a U-shaped cross section. The bed also includes a flat base section and a pair of side wall sections extending upright from both sides of the flat base section. The bed 2 is smaller in width than the width of the table 1 by a predetermined amount so that the table 1 straddles the bed 2 when assembled with the table 1 being disposed upside down to locate its opening at the bottom.

Figure 6A:
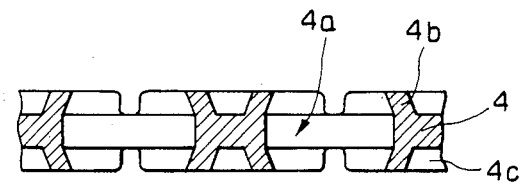
FIGS. 6a and 6b are schematic illustrations showing the detailed structure of the retainer provided in the assembly of FIG. 3.
Figure 6B:
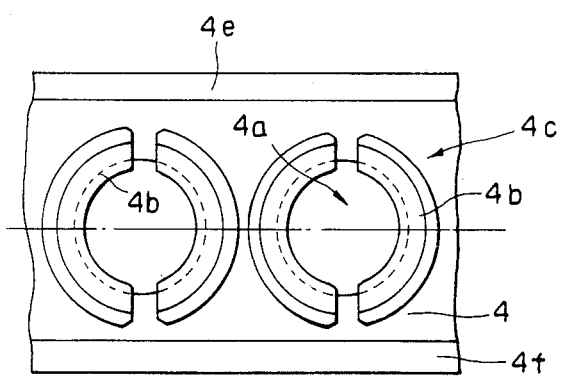

The opposed surfaces of the paired side wall sections of the table 1 and the bed 2 are provided with guide grooves 1a and 2a which are formed in the side wall sections of the bed 2 and the table 1, respectively, thereby defining a guide passage for guiding the movement of rolling members, or balls in the preent embodiment, along the longitudinal direction of the assembly. Also provided are a plurality of balls 3 as interposed between the paired side wall sections of the table 1 and the bed 2 in rolling contact with the paired guide grooves 1a and 2a. A ball retainer 4 is also provided as fitted in a gap between the paired side wall sections of the table 1 and the bed 2, and, as shown in FIGS. 6a and 6b, the retainer 4 is provided with a plurality of holding holes 4a, which are generally circular in shape, as spaced apart from one another at a predetermined pitch along the longitudinal direction.

The retainer 4 is elongated in shape and it includes a generally rectangular plate. Each of the holding holes 4a defined in the retainer 4 is provided with a plurality (two on one side in the illustrated embodiment) of holding tabs 4b arranged around its periphery. The tabs 4b are provided to be commensurate with a spherical surface of the balls 3 to be held so that they extend generally perpendicularly from the plate of the retainer 4 in a convergent fashion. In the preferred embodiment, the tabs 4b are integrally formed from an elastic material, such as plastic so that the balls 3 may be squeezed into the holes 4a to be maintained in position. More importantly, the retainer 4 is also provided with a pair of top and bottom side projections 4e and 4f (see FIG. 5) which project in the direction perpendicular to the flat side surface of the retainer plate as extending along the top and bottom sides on each side surface. In the illustrated embodiment, the side projections 4e and 4f have a height higher than the height of the holding tabs 4b, as best shown in FIG. 4. Preferably, the side projections 4e and 4f are also formed integrally, for example, from a plastic material.

Returning to FIG. 3, an upper end member 5 is fixedly attached to each end of the table 1, and, similarly, a lower end member 6 is fixedly attached to each end of the bed 2. It is to be noted that the lower end member 6 in the form of a plate has a trapezoidal shape with its top side shorter than its bottom side and the upper end member 5 is generally in the form of an inverted "U" but its shape is somewhat modified to be commensurate with the outer contour of the trapezoidally shaped lower end member 6, as best shown in FIG. 4.

Figure 5:
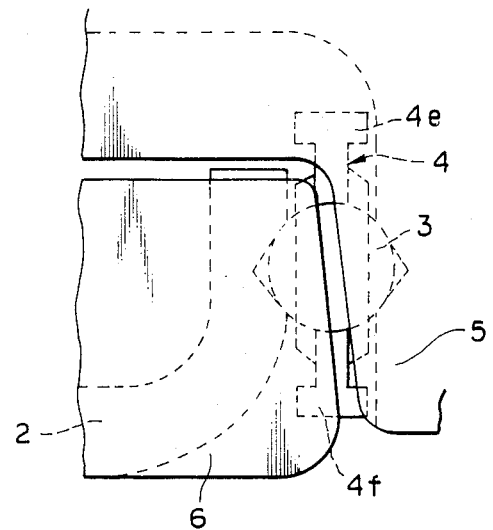
FIG. 5 is a schematic illustration showing part of the structure shown in FIG. 4 on an enlarged scale.

With this structure, as best shown in FIG. 5, the retainer 4 is allowed to come into contact with either one of the associated side wall sections of the table 1 or the bed 2 only through the top and/or bottom side projections 4e and 4f; therefore, the area of the retainer 4 which can come into contact with the associated side wall sections of the table 1 and the bed 2 is limited, thereby preventing an unacceptably large resistance force from being applied to the retainer 4 during the relative motion between the table 1 and the bed 2. Since the side projections 4e and 4f are located closer to the associated side wall sections of the table 1 and the bed 2, the retainer 4 can be maintained at its intended location at all times, thereby allowing the intended smooth relative motion between the table 1 and the bed 2. Furthermore, with the provision of the trapezoidally shaped lower end member 6 and the modified U-shaped upper end member 5, the retainer 4 having an I-shaped cross section has an increased chance of contacting either one or both of the end members 5 and 6 at its extreme stroke, so that the retainer 4 is prevented from accidentally coming out of the assembly undesirably. It should also be notd that the I-shaped cross section is preferred for the retainer 4 because it can provide an increased rigidity which helps to keep the retainer 4 straight and located in its intended position between the paired side wall sections of the table 1 and the bed 2, even if the retainer 4 is formed from an elastic material, such as plastic, to provide a required property for the holding tabs 4b. It should also be noted that the tabs 4b are provided two at each side, but they can be provided in any desired number, and, for that matter, can be continuous all around the periphery of the hole 4a. It should further be noted that the space 4c defined at each side surface between the tabs 4b and the top and bottom side projections 4e and 4f serves as a space for reserving therein a quantity of lubricant. Thus, the retainer 4 of this structure is advantageous in distributing the lubricant uniformly throughout its length.

Figure 7:
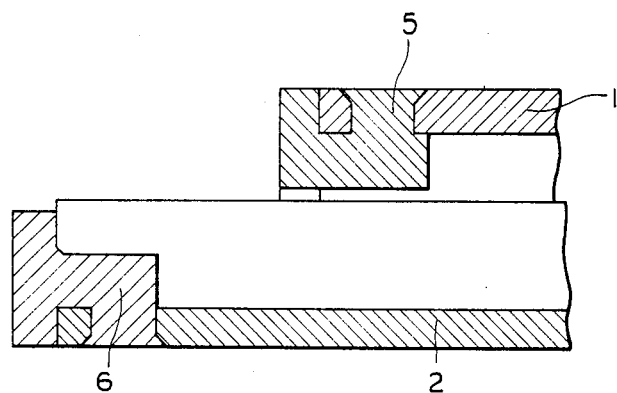
FIG. 7 is a schematic illustration showing an end part of the assembly in transverse cross section.

FIG. 7 schematically shows how the end members 5 and 6 are integrally provided. In the illustrated example, the end members 5 and 6 are comprised of a plastic material and are integrally formed as partly anchored into a hole formed in each of the table 1 and the bed 2. Since the anchoring hole provided in the table 1 and the bed 2 is somewhat flared out at its outer surface and each of the end members 5 and 6 has a portion which is fitted into the corresponding anchoring hole, the end members 5 and 6 are integrally attached to the table 1 and the bed 2, respectively. Such a structure may be easily formed when the end members 5 and 6 are formed from a thermoplastic material.

Figure 8:
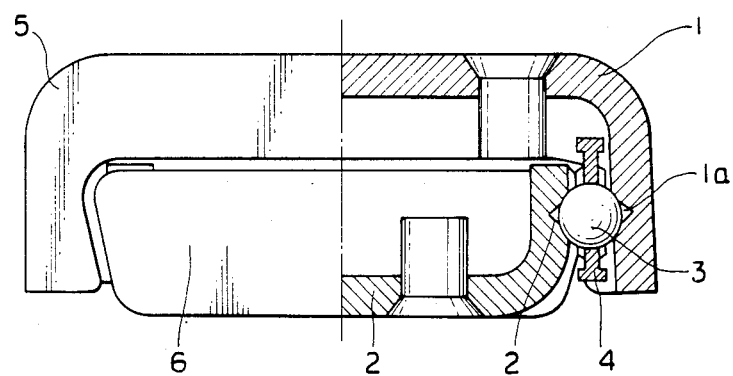
FIG. 8 is a schematic illustration showing another embodiment of the present invention.

FIG. 8 shows another embodiment of the present invention, which is basically the same in structure as the previously described embodiment except that the lower end member 6 has an inverted trapezoidal shape with its top side longer than its bottom side. Thus, the upper end member 5 has a modified U-shaped structure which is commensurate with the contour of the inverted trapezoid of the lower end member 6. It can be easily understood that this embodiment is functionally the same as the previously described embodiment.

FIGS. 9a through 9c show various modifications of the side projections to be provided on the retainer 4. FIG. 9a shows the case in which a number of side projections 4e', each having a square shape, are arranged in the form of an array at each side surface facing the associated side wall section of the table 1 or bed 2. In this embodiment, the square-shaped side projections are arranged along the top and bottom sides in two rows each. FIG. 9b shows another modification in which side projections 4e', each having a square shape, are arranged in a single row along the top and bottom sides on each side surface. This modification may be formed by making the top and side projections 4e and 4f of the retainer 4 shown in FIGS. 6a and 6b discontinuous. FIG. 9c shows a further modification in which a number of side projections 4e", each having a semispherical shape, are provided at each side surface as arranged in the form of an array. It is to be noted that the side projections, e.g., 4e' and 4e", may be provided randomly on each side surface of the retainer 4, if desired. However, it is preferable to provide these side projections more along the top and bottom sides to attain the intended effect of stabilizing the motion of the retainer 4 as much as possible.

As described above, in accordance with the present invention, there is provided a linear motion rolling contact bearing assembly including a retainer having a novel structure, so that the contact surface of the retainer with its associated guide surfaces is limited and thus the sliding resistance may be maintained at a minimum, so that the smooth relative motion between the table and the bed is insured. Since the retainer is provided with an increased number of projections on each side surface, a lubricant may be maintained more uniformly along each side surface, which contributes to maintaining the smooth relative operation between the table and the bed. If the retainer is structured to have an I-shaped cross section, it is provided with an increased rigidity even if the retainer is made from a plastic material, which can also contribute to maintaining the smooth relative operation between the table and the bed. As previously set forth, the retainer 4 is preferably formed from a plastic material by injection molding.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A linear motion rolling contact bearing assembly comprising, in combination:

a generally trough-shaped bed extending in a longitudinal direction of said assembly and having a base section and a pair of side wall sections extending from both sides of said base section;

a generally trough-shaped table having a base section and a pair of side wall sections, said table being provided to straddle said bed thereby locating its pair of side wall sections opposed to the pair of side wall sections of said bed;

a plurality of rolling members interposed between said bed and said table in rolling contact therewith for providing a relative motion between said table and said bed; and retaining means for retaining said plurality of rolling members in position, said retaining means including an elongated plate provided with a plurality of holding holes spaced apart from one another and at least one side projection projecting from said plate toward its associated side wall section of said table or bed;

wherein said retaining means includes a plate with a plurality of raised flat surfaces of a given configuration formed integral with said plate and disposed laterally on each side surface of said plate, said raised surfaces being adapted to provide limited resistance to the sliding of said retaining means and said adjacent side wall section of said bed and said table.

2. A linear motion rolling contact bearing assembly comprising, in combination:

a generally trough-shaped bed extending in a longitudinal direction of said assembly and having a base section and a pair of side wall sections extending from both sides of said base section;

a generally trough-shaped table having a base section and a pair of side wall sections, said table being provided to straddle said bed thereby locating its pair of side wall sections opposed to the pair of side wall sections of said bed;

a plurality of rolling members interposed between said bed and said table in rolling contact therewith for providing a reciprocal linear motion between said table and said bed; and retaining means for retaining said plurality of rolling members in position, said retaining means including an elongated plate provided with a plurality of holding holes spaced apart from one another and at least one side projection projecting from said plate toward its associated side wall section of said table or bed, wherein said retaining means includes said side projection one along the top side and one along the bottom side at each side surface of said plate, so that said retaining means has an I-shaped cross section.

3. A linear motion rolling contact bearing assembly comprising, in combination:

a generally trough-shaped bed extending in a longitudinal direction of said assembly and having a base section and a pair of side wall sections extending from both sides of said base section;

a generally trough-shaped table having a base section and a pair of side wall sections, said table being provided to straddle said bed thereby locating its pair of side wall sections opposed to the pair of side wall sections of said bed;

a plurality of rolling members interposed between said bed and said table in rolling contact therewith for providing a reciprocal linear motion between said table and said bed; and retaining means for retaining said plurality of rolling members in position, said retaining means including an elongated plate provided with a plurality of holding holes spaced apart from one another and at least one side projection projecting from said plate toward its associated side wall section of said table or bed, wherein said rolling members are balls and said retaining means further includes at least one holding tab at each side surface of said plate and extending along each of said holding holes and projecting sideways from said plate, wherein said holding tab is lower in height than said side projection.

4. A linear motion rolling contact bearing assembly comprising, in combination:

a generally trough-shaped bed extending in a longitudinal direction of said assembly and having a base section and a pair of side wall sections extending from both sides of said base section;

a generally trough-shaped table having a base section and a pair of side wall sections, said table being provided to straddle said bed thereby locating its pair of side wall sections opposed to the pair of side wall sections of said bed;

a plurality of rolling members interposed between said bed and said table in rolling contact therewith for providing a reciprocal linear motion between said table and said bed;

retaining means for retaining said plurality of rolling members in position, said retaining means including an elongated plate provided with a plurality of holding holes spaced apart from one another and at least one side projection projecting from said plate toward its associated side wall section of said table or bed; and a first end member fixedly attached to each end of said bed, said first end member being generally trapezoidally shaped, and a second end member fixedly attached to each end of said table, said second end member being generally U-shaped substantially congruent with the contour of said trapezoidally shaped first end member.

5. A linear motion rolling contact bearing assembly comprising, in combination:

a generally trough-shaped bed extending in a longitudinal direction of said assembly and having a base section and a pair of side wall sections extending from both sides of said base section;

a generally trough-shaped table having a base section and a pair of side wall sections, said table being provided to straddle said bed thereby locating its pair of side wall sections opposed to the pair of side wall sections of said bed;

a plurality of rolling members interposed between said bed and said table in rolling contact therewith for providing a reciprocal linear motion between said table and said bed;

retaining means for retaining said plurality of rolling members in position, said retaining means including an elongated plate provided with a plurality of holding holes spaced apart from one another and at least one side projection projecting from said plate toward its associated side wall section of said table or bed; and a first end member fixedly attached to each end of said bed, said first end member being generally trapezoidally shaped, and a second end member fixedly attached to each end of said table, said second end member being generally U-shaped substantially congruent with the contour of said trapezoidally shaped first end member wherein said trapezoidally shaped first end member has a top side which is shorter than its bottom side.

6. A linear motion rolling contact bearing assembly comprising, in combination:

a generally trough-shaped bed extending in a longitudinal direction of said assembly and having a base section and a pair of side wall sections extending from both sides of said base section;

a generally trough-shaped table having a base section and a pair of side wall sections, said table being provided to straddle said bed thereby locating its pair of side wall sections opposed to the pair of side wall sections of said bed;

a plurality of rolling members interposed between said bed and said table in rolling contact therewith for providing a reciprocal linear motion between said table and said bed;

retaining means for retaining said plurality of rolling members in position, said retaining means including an elongated plate provided with a plurality of holding holes spaced apart from one another and at least one side projection projecting from said plate toward its associated side wall section of said table or bed; and a first end member fixedly attached to each end of said bed, said first end member being generally trapezoidally shaped, and a second end member fixedly attached to each end of said table, said second end member being generally U-shaped substantially congruent with the contour of said trapezoidally shaped first end member wherein said trapezoidally shaped first end member has a top side which is longer than its bottom side.

* * * * *